Figure 1:
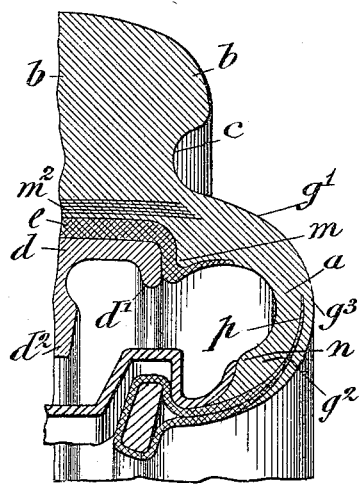

T. L. CARBONE.
RESILIENT TIRE.
APPLICATION FILED MAR. 23, 1914.

1,195,556.

Patented Aug. 22, 1916.
2 SHEETS—SHEET 1.

T. L. CARBONE.
RESILIENT TIRE.
APPLICATION FILED MAR. 23, 1914.
1,195,556.
Patented Aug. 22, 1916.
2 SHEETS—SHEET 2.
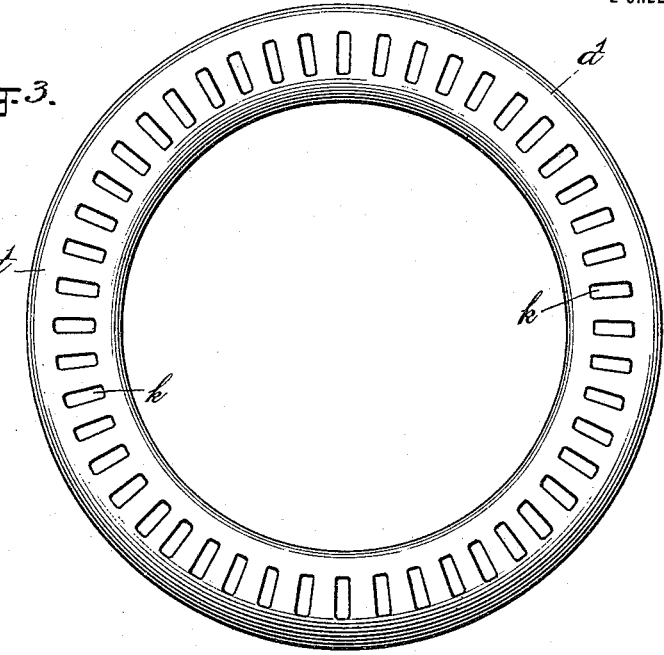
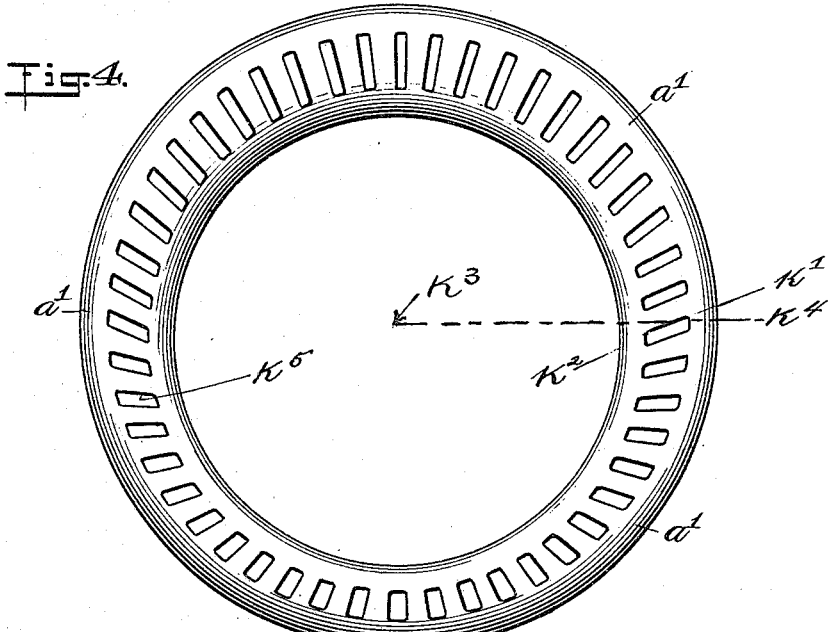

UNITED STATES PATENT OFFICE.

TITO LIVIO CARBONE, OF CHARLOTTENBURG, GERMANY.

RESILIENT TIRE.

1,195,556.   Specification of Letters Patent.   Patented Aug. 22, 1916.

Original application filed February 12, 1910, Serial No. 543,525. Divided and this application filed March 23, 1914. Serial No. 826,761.

*To all whom it may concern:*

Be it known that I, TITO LIVIO CARBONE, a citizen of the Swiss Republic, and a resident of Charlottenburg, near Berlin, Germany, have invented new and useful Improvements in Resilient Tires, of which the following is a good specification.

This is a divisional application of the copending application filed by me on February 12, 1910, under Serial No. 543,525.

This invention, as also the invention just referred to, relates to resilient tires of the kind wherein rigid rings are connected with each other.

The object of the invention is to provide a tire which does not have the objectionable features of the tires hitherto in use, and in consequence has long life and resiliency.

The present invention, however, has for its object to provide a specially resilient tire, and for this purpose, the rubber tire casing is provided with cut-out portions of fabric so that the pieces which remain, act to form spaced parts.

Various embodiments of the invention may be used, and one embodiment is shown in the drawings hereto annexed, and the invention will be described hereinafter, and finally pointed out in the claims.

Figure 2:
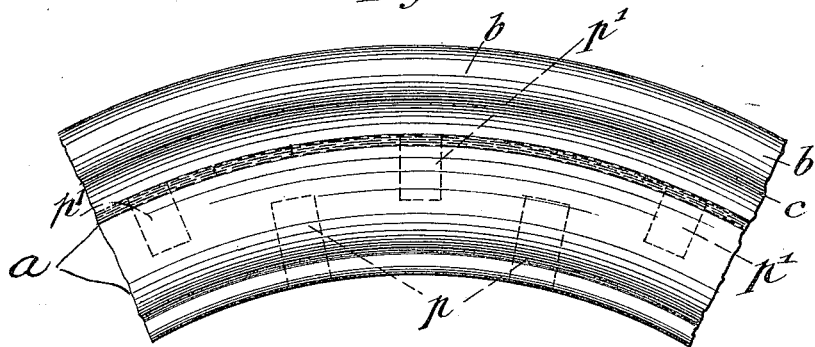

In the accompanying drawings, Figure 1 is a vertical transverse section of a tire showing a fragmentary portion thereof. Fig. 2 is a side elevation of a part of a cover. Fig. 3 is a side elevation of a cover provided with cut-out portions, when the same is not under load, and Fig. 4 is a side elevation of a tire like that shown in Fig. 4 when under load.

Similar letters of reference indicate corresponding parts throughout the various figures.

Referring to the drawings, and more particularly to Fig. 2, where a side elevation of a part of a tire casing $a$, is shown, this tire casing $a$ is provided with a tread $b$ having indents $c$, one on each side of the tire, and having spaced pieces of fabric indicated by $p$ and $p'$. These pieces of fabric are spaced apart certain distances, the pieces $p$ extending radially from the wheel rim or stretching ring used in tires of this kind, and the pieces $p'$ extending radially from the floating ring $d$, such as used in tires of this kind.

In Fig. 1, the floating ring is shown with the strengthening rib $d^2$, and is also provided at its lateral edges with radial ribs $d'$. A layer of fabric $e$ and a plurality of spaced layers of fabric $m^2$ are adjacent this ring $d$. The tire casing $a$ is composed at the side of the members $g'$ and $g^2$ extending laterally outwardly and joining at $g^3$ forming a laterally outwardly extending fold. The tire casing $a$ is also provided with cushioning enlargements $m$ and $n$, which, when the tire is used, serve to press against the sides of the rings.

In the embodiment shown in Fig. 1, the folds extend laterally outwardly, and are made of rubber together with the upwardly extending pieces of fabric $p$. The fold is provided at both sides of the rings and extends circumferentially around the same, being bent laterally outwardly with respect to the central plane of the rings. The folds are vulcanized to a permanent mean normal shape, and the fold shape is retained when the load is applied. When distorted in any direction from this mean normal shape, by the relative movements of the floating ring with respect to the stretching ring, the folds always react to return to initial position. The direction of bend of the fold may be changed.

In Figs. 3 and 4, the tire there shown indicates a continuous tire casing, which is provided with cut-out portions. When the tire is not under load, the cut-out portions $k$ of this cover $a'$ are all in radial position, but when the tire is under load, the cut-out portions $k$ of the casing $a'$ at the lowermost portion and at the uppermost portion of the cover remain radial, but become oblique to the radial at the parts between the uppermost and lowermost parts of the wheel. This oblique position is shown by the line $k'$, $k^2$, which is inclined to the radius $k^3$, $k^4$.

The cover may be made of any suitable material, and several embodiments of my invention have been shown, but I do not wish to be limited to the details thereof, since changes may be made therein within the scope of the appended claims. Rigid rings have also been referred to, but it is clear that any separated annular portions may be understood by this term which operate in a like manner. As one instance, reference may be made to the rim of the wheel which may act as an inner ring.

The operation of the tire is as follows:

When the tire is not under load, the cover maintains the rigid rings in a position concentric with each other. When, however, a load is applied, and pressure is exerted on the hub of the wheel, the concentricity of the rigid rings ends, and eccentricity of the rigid rings begins. Thereby, that part of the inner or stretching ring under the hub approaches the part of the outer or floating ring under the hub, and that part of the stretching ring above the hub recedes from the part of the floating ring above the hub. The lowermost part of the stretching ring approaches the lowermost part of the floating ring in a substantially radial direction, and the uppermost part of the stretching ring recedes from the uppermost part of the floating ring in a substantially radial direction. The parts of the stretching ring intermediate these lowermost and uppermost parts, are moved from their natural position in line with the radius common to both rings when concentric, to a position below this radius of the floating ring, so that the line connecting the stretching and floating rings at this point becomes oblique to this floating ring radius. The extremities of the cover forming the connections between the rings, partake of the movement of the rings. At the bottom of the tire when under load, the extremities approach each other in a line substantially radial to the tire, and at the top of the tire when under load, the extremities recede from each other in a line radial to the tire. The amount of approach and recession from the normal or initial distance corresponding to that when the connections are in their natural position, depends on the load applied, and varies along the circumference of the tire, the largest amount of approach being at the bottom of the tire from which a decrease takes place until normal distance results, about at points on a horizontal line with the hub of the wheel, when recession begins until maximum recession is reached at the top of the tire. Throughout, the connections, when distorted, tend always to return their extremities to natural position corresponding to permanent mean normal shape. The vulcanization and strength of the folds are such that these folds are permanent, that is, they never assume a straight line configuration under normal load. Any two extremities of the circumferential portions of the connections, excepting those at the uppermost, and lowermost parts of the tire, which would be in a radial plane when the tire is not under load, have one of the extremities disposed out of that radial plane when load is applied. The largest amount of distortion in a direction oblique to the radial, takes place at the parts of the tire on a horizontal line passing through the hub, and this out of plane displacement decreases toward the bottom and toward the top, no out of plane distortion, not now considering the distortion due to torque, taking place at the top and bottom of the tire where only radial distortion in the same plane takes place. Throughout this out of plane distortion also, the connections always tend to return their extremities to their natural position, corresponding to permanent mean normal shape because they have been vulcanized into a permanent form by reason of which they develop reactions against bending and twisting throughout the length of the continuous connections at the parts other than the top and bottom, which lateral parts resist a bending and twisting distortion and suspend the load. The simultaneously acting circumferentially arranged connections, or folds, in the specific embodiments, permit the floating ring to move in any direction, within certain limits in respect to the stretching ring when load is applied, or when obstacles are encountered, seeking always to bring the rings to their initial position concentric with each other, whereby along the circumference of the rings a corporation in the continuous connection takes place to elastically suspend the load.

In my present invention, the spaced fabric pieces extend alternately upwardly from the stretching ring, and downwardly from the floating ring, or the continuous fabric layer is provided with cutout portions, both of which embodiments permit quick movement of the inner cover. The fold has been vulcanized to mean normal shape, and has, as stated, the tendency to react to its normal or initial position, and the spaced pieces of fabric or the cut-out portions of the fabric wall permit the quick response of the cover to this tendency to react.

I claim:

1. In resilient tires having normally spaced rings, a tire casing connecting the rings, having folds around the circumference of both sides of said rings, vulcanized to a permanent fold shape sharply and laterally bent away from said rings, which folds, when distorted by a relative movement of said rings with respect to each other, react simultaneously throughout the circumference to return to initial shape, said fold shape being retained under load and at all times, so that the strains in the cover are of a bending nature, said cover being made of elastic material, with spaced pieces of fabric extending from circumferentially spaced points of the tire, said spaced pieces of fabric extending into that part of the tire casing between said rings.

2. In resilient tires having normally spaced outer and inner rings separate from the tire casing, a tire casing separate from said rings and connecting the rings, said tire casing being made of material adapted to resist relative displacement of said rings with respect to each other, and being fitted over and closely around said outer ring, said cover having folds around the circumference of both sides of said rings, vulcanized to a permanent fold shape sharply and laterally bent away from said rings, which folds, when distorted by a relative movement of said rings with respect to each other react simultaneously throughout the circumference to return to initial shape, said fold shape being retained under load and at all times, so that the strains in the cover are of a bending nature, the portion of said folds occupying a substantial part of the space intermediate said rings, at circumferentially spaced zones thereof, being of greater rigidity than the zones thereof between said first mentioned zones.

In testimony, that I claim the foregoing as my invention, I have signed my name in presence of two subscribing witnesses.

TITO LIVIO CARBONE.

Witnesses:
F. Hogg,
G. Lowe.

Copies of this patent may be obtained for five cents each, by addressing the "Commissioner of Patents, Washington, D. C."